US009990237B2

(12) United States Patent
Tsirkin

(10) Patent No.: US 9,990,237 B2
(45) Date of Patent: Jun. 5, 2018

(54) LOCKLESS WRITE TRACKING

(75) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 272 days.

(21) Appl. No.: 13/032,873

(22) Filed: Feb. 23, 2011

(65) Prior Publication Data
US 2012/0216007 A1 Aug. 23, 2012

(51) Int. Cl.
*G06F 12/16* (2006.01)
*G06F 9/52* (2006.01)
*G06F 11/20* (2006.01)
*G06F 12/14* (2006.01)

(52) U.S. Cl.
CPC .......... *G06F 9/526* (2013.01); *G06F 11/2056* (2013.01); *G06F 12/145* (2013.01); *G06F 2201/855* (2013.01); *G06F 2209/522* (2013.01)

(58) Field of Classification Search
CPC ...................................................... G06F 9/526
See application file for complete search history.

(56) References Cited

U.S. PATENT DOCUMENTS

| | | | | |
|---|---|---|---|---|
| 6,466,950 B1* | 10/2002 | Ono | ................ | G06F 17/30581 |
| 6,993,635 B1* | 1/2006 | Gazit | ................ | G06F 11/2082 |
| | | | | 711/114 |
| 7,251,708 B1* | 7/2007 | Justiss et al. | ................ | 711/111 |
| 7,277,897 B2* | 10/2007 | Bamford et al. | ............. | 707/782 |
| 7,434,002 B1* | 10/2008 | Zedlewski et al. | ........... | 711/130 |
| 8,126,853 B2* | 2/2012 | Sakamoto | ...................... | 707/688 |
| 8,656,386 B1* | 2/2014 | Baimetov | ........... | G06F 9/45558 |
| | | | | 709/219 |
| 2002/0152429 A1* | 10/2002 | Bergsten | ............. | G06F 11/1471 |
| | | | | 714/43 |
| 2007/0244937 A1* | 10/2007 | Flynn, Jr. | ............. | G06F 11/1662 |
| 2009/0276470 A1* | 11/2009 | Vijayarajan et al. | ......... | 707/202 |
| 2010/0088280 A1* | 4/2010 | Satoyama | ........... | G06F 11/1471 |
| | | | | 707/640 |
| 2011/0145201 A1* | 6/2011 | Holst | ................... | G06F 11/2064 |
| | | | | 707/655 |
| 2011/0202919 A1* | 8/2011 | Hayakawa | .......... | G06F 9/45558 |
| | | | | 718/1 |
| 2011/0219271 A1* | 9/2011 | Kaneko et al. | ............... | 714/47.1 |
| 2013/0024722 A1* | 1/2013 | Kotagiri | .............. | G06F 11/1004 |
| | | | | 714/6.1 |

* cited by examiner

*Primary Examiner* — Daniel D Tsui
*Assistant Examiner* — Eric T Loonan
(74) *Attorney, Agent, or Firm* — Withrow & Terranova, PLLC

(57) ABSTRACT

A method and system for tracking write access in a memory. The memory is partitioned into pages and each page is pointed to by a pointer. Upon receiving a request from a requester, a computer system stores a copy of a file that contains pointers to modified pages in the memory. The computer system then clears the file, and protects the pages in the memory from write access after clearing of the file. The stored copy of the file is sent to the requester.

13 Claims, 5 Drawing Sheets

LOCKLESS WRITE TRACKING

TECHNICAL FIELD

Embodiments of the present invention relate to a computer system, and more specifically, to memory management in a computer system.

BACKGROUND

A computer system often needs to keep track of the pages in a memory that are modified during operation. The memory may be allocated to a guest in a virtual machine system or a user space process. At some point of the operation, another process (a requester) may wish to know which of the pages have been modified. The requester may need to copy the modified pages to another location; for example, to a new location to which the guest allocated with the memory is migrating. To track the modified pages, the computer system keeps a log file to record pointers to the pages that have been modified. Upon request, the log file is passed to the requester.

To ensure write accesses to the pages are accurately tracked, a conventional computer system typically locks the memory upon receipt of the request for the log file. The lock prevents memory pages from being made writable by any guest or process, blocking the guest or process if it requests this access. In particular, if a memory page is write-protected for write-tracking purposes, locking suspends guest/process write access to this memory and, therefore, degrades system performance. However, without using a lock, the computer system may fail to capture a write access during the time the system is prepared for a new round of write tracking.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for tracking write access in a memory. In one embodiment, the memory is partitioned into pages and each page is pointed to by a pointer. Upon receiving a request from a requester, a computer system stores a copy of a file that contains pointers to modified pages in the memory. The computer system then clears the file, and protects the pages in the memory from write access after clearing of the file. The stored copy of the file is sent to the requester.

According to embodiments of the present invention, the memory is not locked between the "clear" operation and the "write-protect" operation. Thus, an advantage of the embodiments described herein is to allow a sequence of operations to take place for tracking write access, without any locks between the individual operations. Locking protects a memory pages from being made writable (in some implementations, prevents all access to page tables) by a hypervisor, guest, operating system, and user-space process. Thus, locking degrades the system performance. Nevertheless, depending on the CPU architecture used, one or more of the operations described herein (or parts thereof) may internally use a lock for correctness. However, the internal lock is used within an individual operation and is released upon completion of the individual operation.

Throughout the following description, the term "guest" refers to the software that runs or can run on the hypervisor. A guest may be installed on a disk, loaded into memory, or currently running. A guest may include one or more of the following: a firmware copy in memory, an operating system, additional installed software, a browser, applications running on the browser, etc. The term "virtual machine (VM)" refers to part of a hypervisor and the host system running the hypervisor that are visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
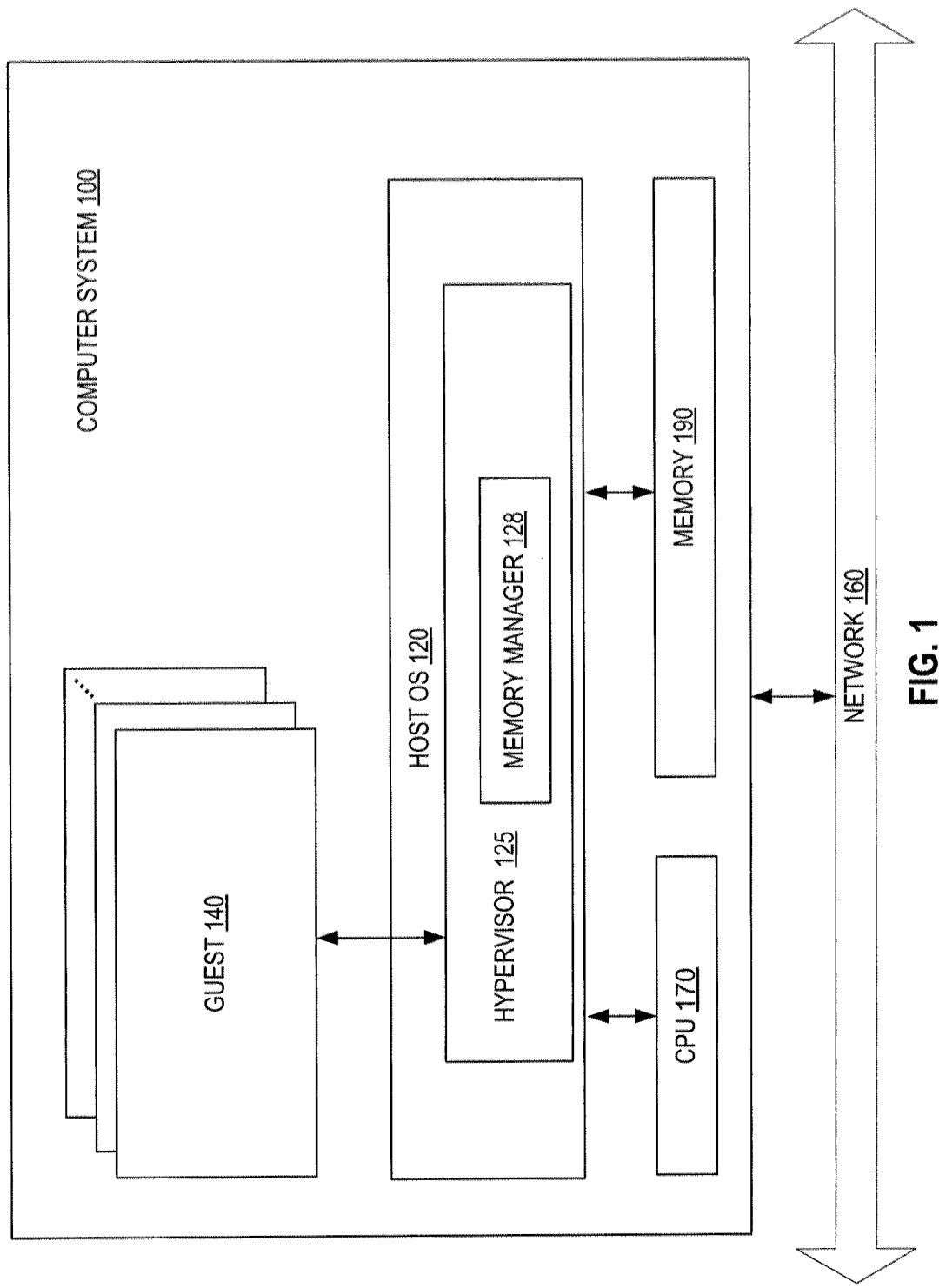
FIG. 1 is a block diagram of a computer system in which embodiments of the present invention may operate.

FIG. 1 is a block diagram that illustrates an embodiment of a computer system 100 in which embodiments of the present invention may operate. The computer system 100 is a virtual machine system that hosts one or more guests (e.g., guest 140). Each guest runs a guest operating system to manage its resources. The guests may run the same or different guest operating systems. Examples of the guest operating system include Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 125 to virtualize access to the underlying host hardware for the guests, making the use of the host hardware transparent to the guests and the users of the computer system 100. The hypervisor 125 may also be known as a virtual machine monitor (VMM) or a kernel-based hypervisor. In some embodiments, the hypervisor 125 may be part of a host OS 120.

In one embodiment, the computer system 100 is accessible by remote systems via a network 160. The network 160 may be a private network (e.g., a local area network (LAN), a wide area network (WAN), intranet, etc.) or a public network (e.g., the Internet). The computer system 100 also includes hardware components such as one or more physical central processing units (CPUs) 170, memory 190 and other hardware components.

According to one embodiment of the present invention, the hypervisor 125 includes a memory manager 128 to track the write access to a memory space allocated to the guest 140. The memory space is partitioned into a number of pages (e.g., 4K-byte blocks). Each page is designated as writable or write-protected. When a page is write-protected, a request to write into the page triggers a fault. In response, the memory manager 128 records the page as modified, and removes the write protection of the page to allow the requested write access. Modification to the page is recorded only when the page is write-protected (that is, it is not recorded when the page becomes writable). The page will remain writable until the memory manager 128 write-protects it again in response to a request for a list of modified pages.

In one embodiment, the memory manager 128 initially marks all of the pages in a given memory space as write-protected. The memory manager 128 keeps a log file recording pointers to the pages that have been modified. In some scenarios, a requester (e.g., part of a hypervisor module or OS module that manages migration) may request to access the log file. For example, the log file may be needed when the guest 140 allocated with the memory space is migrating to another location (e.g., another computer system or another hypervisor in the same computer system). Instead of copying all of the pages in the allocated memory space to the new location, the computer system 100 copies only the pages that have been modified. In one embodiment, the memory manager 128 tracks the write access continuously: when the log file is requested by the requester, the memory manager 128 can store a copy of the log file, reset (i.e., clear the contents of) the log file, write-protect the pages that have become writable, and send the stored copy to the requester. The memory manager 128 then starts a new round of write tracking.

It will be apparent, to one skilled in the art, that the log file described herein can be implemented in a variety of ways. For example, the computer system 100 may use an in-memory array utilizing a bit set for a modified page and clear for an unmodified page, another in-memory data structure, a file on disk, etc.

Embodiments of the present invention allow efficient write tracking. It is not necessary to lock the memory when a request for the log file is received. In response to the request for the log file, the memory manager 128 clears the log file and then protects the pages from write access. Even if the guest 140 writes into the memory between the "clear" operation and the "write-protect" operation, this write access can still be correctly recorded in a log file.

Figure 2:
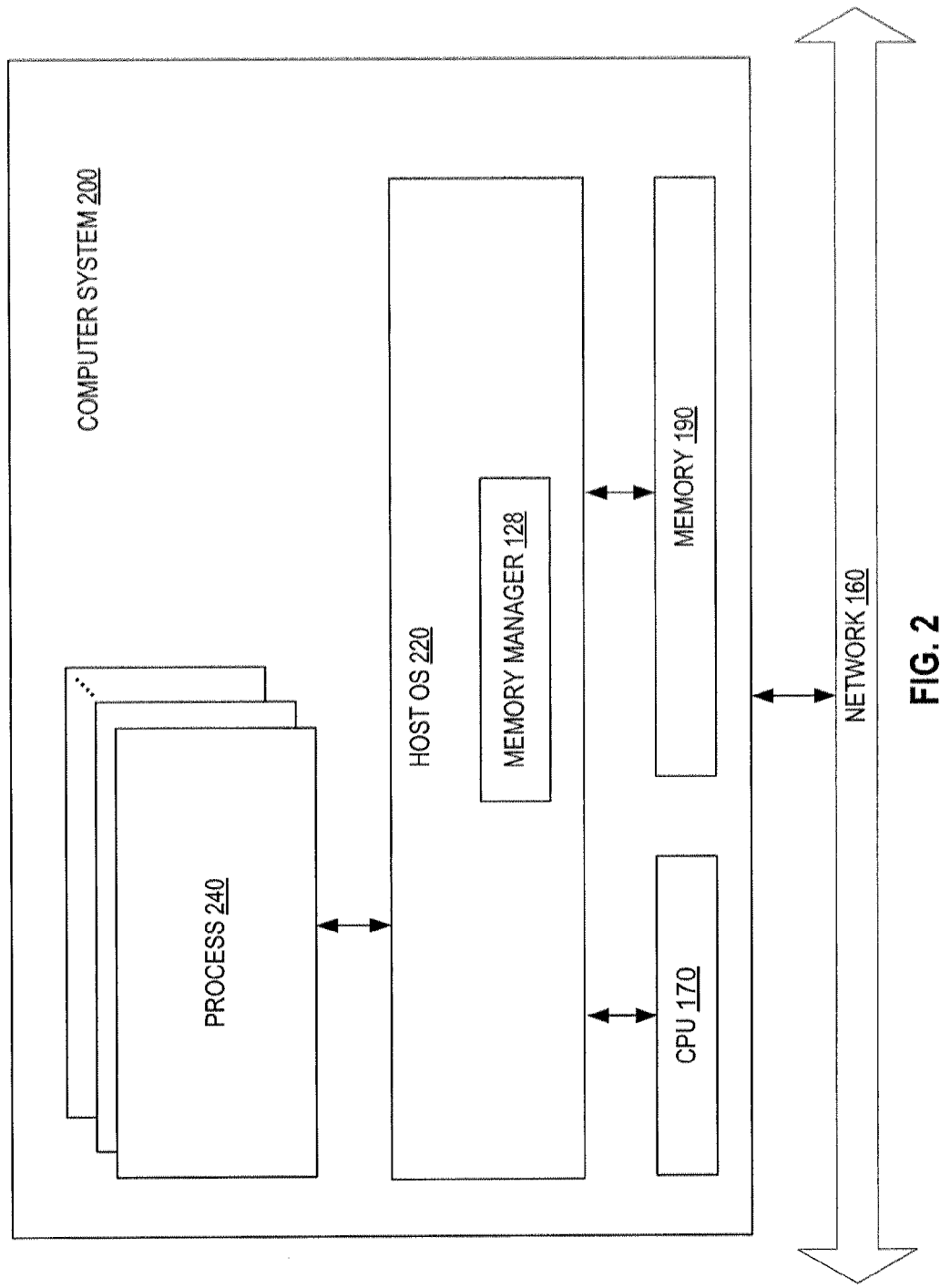
FIG. 2 is a block diagram of another computer system in which embodiments of the present invention may operate.

FIG. 2 is a block diagram that illustrates an alternative embodiment of a computer system 200 in which embodiments of the present invention may operate. In this embodiment, the computer system 200 is a non-virtualized system; that is, the computer system 200 does not host any virtual machines or guests. Instead of hosting guests, the computer system 200 runs a number of user space processes 240 that are managed by the host OS 220. The host OS 220 includes the memory manager 128, which tracks the write access of the processes 240 using the same mechanism as described above in connection with FIG. 1.

In the following description, it is understood that the operations involving a guest in a virtual machine system can be equally applicable to the operations involving a user space process in a non-virtualized system.

Figure 3:
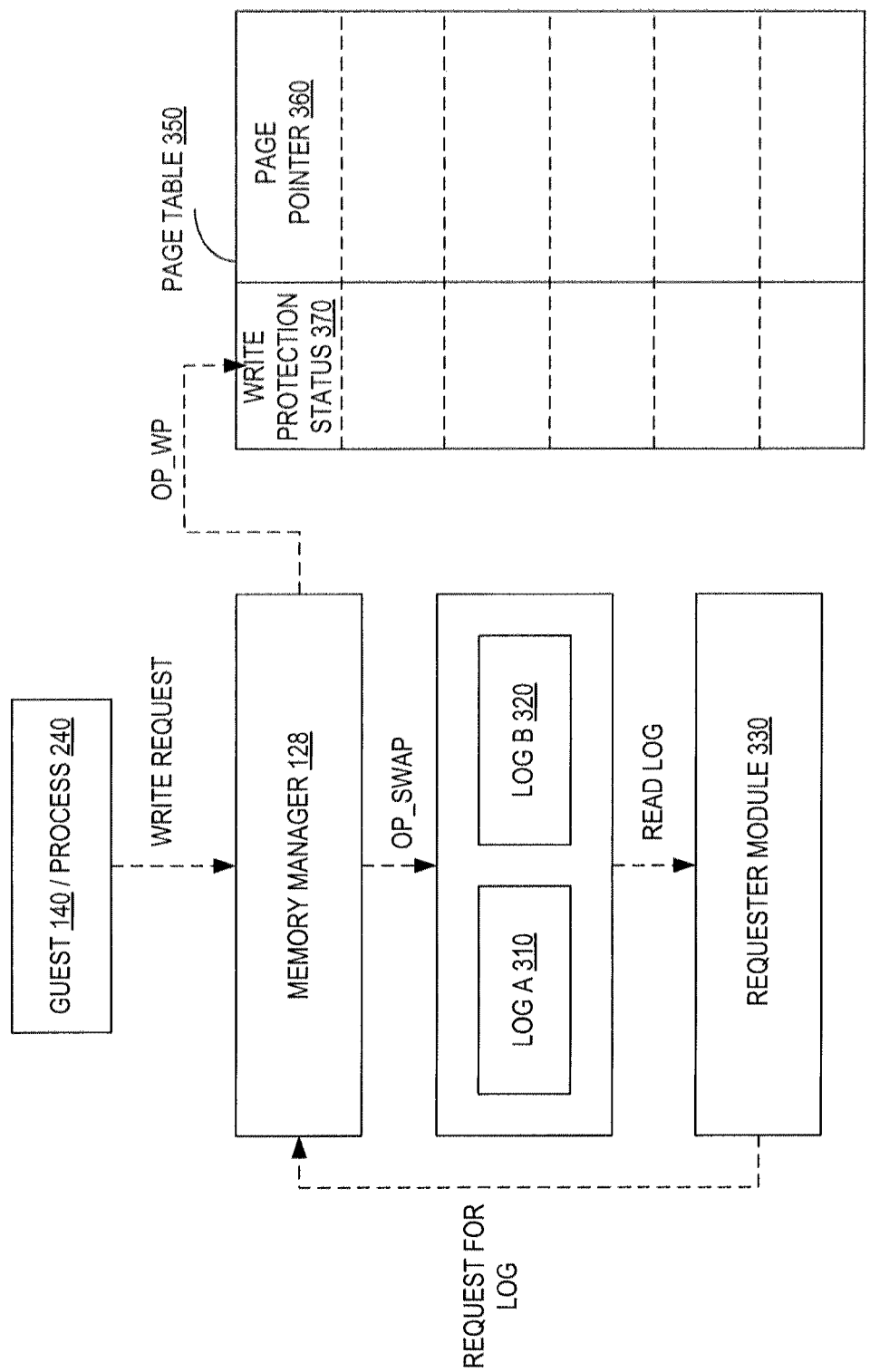
FIG. 3 illustrates an example of a memory manager that tracks write access to a memory.

FIG. 3 illustrates an example of an interaction between the memory manager 128 and the guest 140 (which would be the user space process 240 in a non-virtualized system). The guest 140 is allocated with a memory, which is partitioned into pages. The memory manager 128 maintains a page table 350, which records pointers 360 to the pages and write protection status 370 of the pages. The memory manager 128 also maintains a log file 310, which records the pointers to the pages that have been modified since the last time the log file 310 was reported to a requester. In one embodiment, all of the pages in the pages table 350 are initially marked as write protected in the write protection status 370. When the guest 140 issues a request to write a page, the memory manager 128 records the pointer to the requested page in the log file 310 and changes the write protection status 370 of the requested page to writable. The guest 140 then obtains write access to the requested page. The guest 140 continues to issue multiple write requests to write multiple pages. At some point in time, a requesting module 330 (e.g., part of a migration-managing hypervisor module or OS module) issues a request for the log file 310. In response, the memory manager 128 stores a copy of the log file 310 in a memory location 320, clears the log file 310, write-protects the pages in the page table 350, and then sends the copy of the log file 310 (in the memory location 320) to the requester module 330.

In one embodiment, after the requester module 330 reads the copy in the memory location 320, the requester module 330 may release or discard the memory location 320. The memory manager 128 then requests the allocation of a new memory location 320 next time it needs to save a copy of the log file 310 for sending it to a requester module 330. In an alternative embodiment, the memory manager 128 may clear the log file 310 by swapping the pointer to a log file A with the pointer to a clean log file B. Log file A is the log file that contains the pointers to the modified pages and log file B is a clean file. By swapping the pointer to log file A with the pointer to log file B, the memory manager 128 makes log file A available to the requester module 330 and obtains a clean log file (i.e., log file B) to start anew round of write tracking. In one embodiment, after the requester module 330 finishes reading log file A, the requester module 330 or a background process clears log file A. Thus, after the new round of write access is recorded in log file B, the memory manager 128 can swap the pointers to log file A and log file B again to obtain a clean log file for another round of write tracking.

In one embodiment, the memory manager 128 write-protects the pages in the page table 350 by updating the write protection status 370 in the page table 350, such that all of the pages in the page table 350 are write protected. The write-protect operation may be repeated for each page when necessary. The operation sequence (that is, the clear operation followed by the write-protect operation) ensures that the log file 310 tracks all instances of write access to the pages.

According to embodiments of the present invention, if the guest 140 writes to a page (P1) after the clear operation and before the write-protect operation, the pointer to P1 will be recorded either in the log file 310 (if P1 is writable before the write occurs) or in the stored copy of the log file 310 (if P1 is write-protected when the write occurs). In an embodiment where the requester module 330 is to make a copy of the modified pages, the copying may take place after all of the pages are write protected, such that the copy will contain updates to P1 (if any) made between the clear operation and the write-protect operation.

Figure 4:
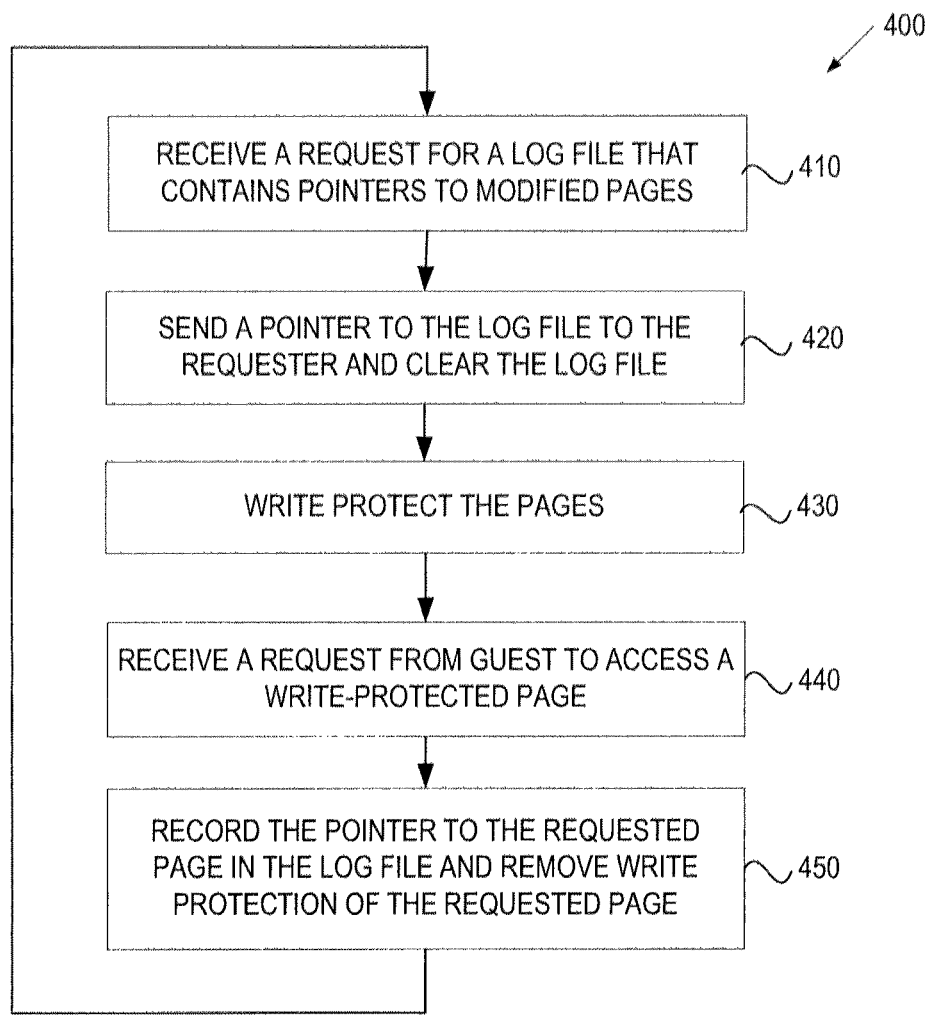
FIG. 4 is a flow diagram of one embodiment of a method for tracking memory access.

FIG. 4 is a flow diagram illustrating one embodiment of a method 400 for tracking write access to a memory. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the memory manager 128 of FIG. 1 (in a virtual machine system) and FIG. 2 (in a non-virtualized system).

Referring to FIG. 4, in one embodiment, the method 400 begins when the memory manager 128 receives a request from a requester (e.g., the requester module 330 of FIG. 3) for a log file that contains pointers to modified pages in a memory, the write access to which is being tracked (block 410). In response, the memory manager 128 stores a copy of the log file in a memory location (block 420), and clears the log file (block 430). The memory manager 128 then write-protects all of the pages in the memory (block 440), and then sends the copy of the log file to the requester module (block 450).

At some point in time during operation, the memory manager 128 receives a request from the guest or the user space process for writing into one of the write-protected pages (block 460). The memory manager 128 traps this request. The memory manager 128 then records the pointer to the requested page in the log file and removes the write protection of the requested page to allow write access (block 470). The operations of blocks 460 and blocks 470 may repeat until the memory manager 128 receives a request from a requester for a log file (block 410). The method 400 then repeats the operations of blocks 420-470.

Figure 5:
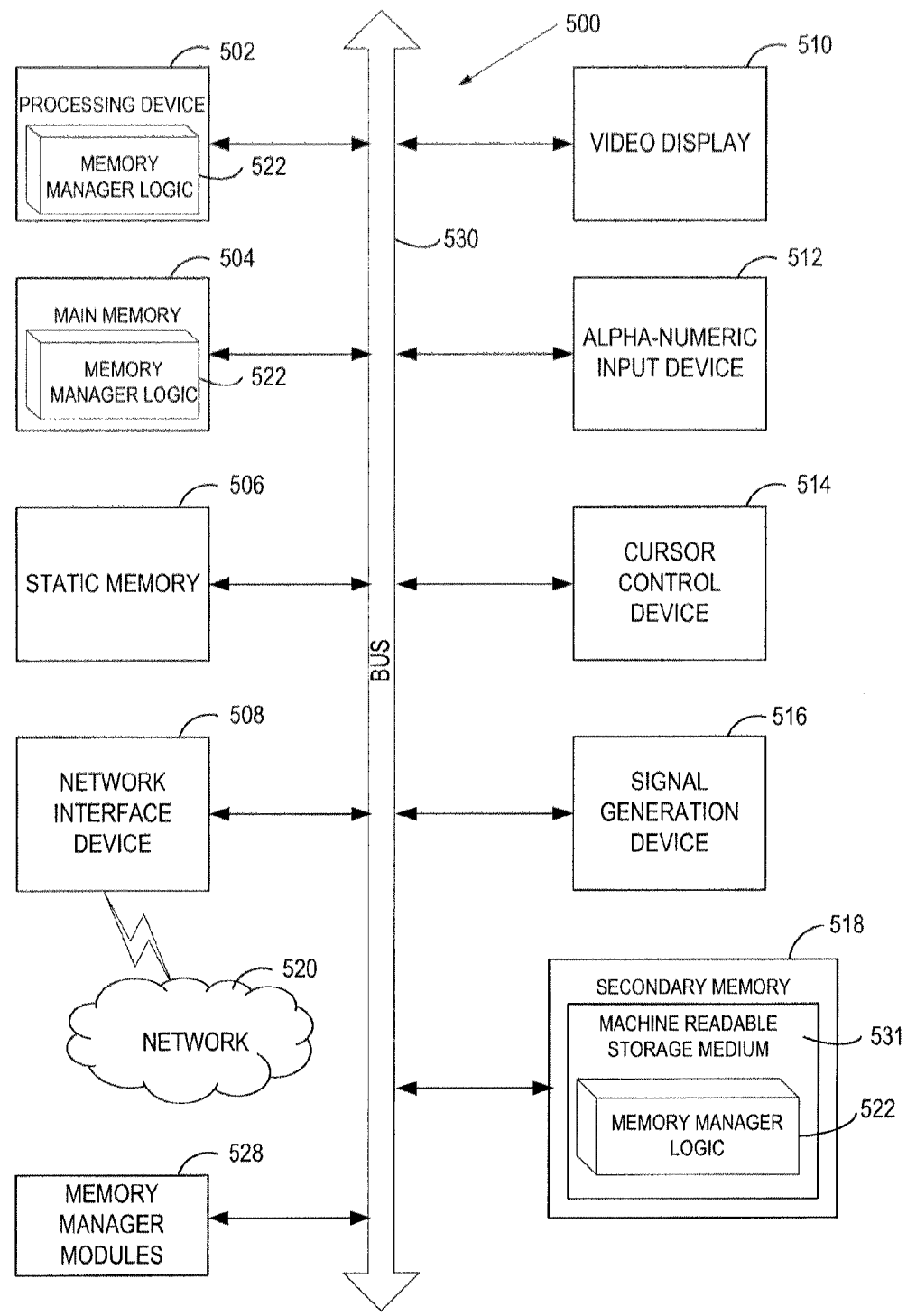
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or ore of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute memory manager logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., memory manager logic 522) embodying any one or more of the methodologies or functions described herein (e.g., the memory manager 128 of FIGS. 1 and 2). The memory manager logic 522 may also reside, completely or at least partially, within the main memory 504 and/or within the processing device 502 during execution thereof by the computer system 500; the main memory 504 and the processing device 502 also constituting machine-readable storage media. The memory manager logic 522 may further be transmitted or received over a network 520 via the network interface device 508.

The machine-readable storage medium 531 may also be used to store the memory manager logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include memory manager modules 528 for implementing the functionalities of the memory manager 128 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "storing", "clearing", "protecting", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    marking, at a first time by a processing device, in a page table that identifies a location of each memory page of a plurality of memory pages, each memory page as having a write-protected status;
    receiving a write request to write to a first memory page of the plurality of memory pages;
    removing, from the page table, the write-protected status from the first memory page;
    recording a pointer to the first memory page in a first logfile;
    receiving a first logfile request from a requester to obtain contents of the first logfile;
    in response to receiving the first logfile request, generating a second logfile that is empty in which subsequent accesses to memory pages having the write-protected status are to be recorded;
    marking in the page table, at a second time by the processing device, all of the plurality of memory pages as having the write-protected status; and
    sending the first logfile to the requester to identify, to the requester, memory pages that have been modified since a previous logfile request from the requester.

2. The method of claim 1, wherein generating the second logfile further comprises: replacing a first pointer that points to the first logfile with a second pointer that points to the second logfile.

3. The method of claim 1, wherein the plurality of memory pages is not locked prior to marking the plurality of memory pages as having the write-protected status.

4. The method of claim 1, wherein sending the first logfile to the requester is performed responsive to marking the plurality of memory pages as having the write-protected status.

5. The method of claim 1 further comprising:
    receiving, subsequent to generating the second logfile and prior to marking, at a second time by the processing device, the plurality of memory pages as having the write-protected status, a request to write to a second memory page that has the write-protected status;
    removing the write-protected status from the second memory page; and
    recording a pointer to the second memory page in the second logfile.

6. The method of claim 1 further comprising:
    subsequent to marking in the page table, at the second time by the processing device, all of the plurality of memory pages as having the write-protected status, receiving a plurality of write requests to write to a corresponding set of memory pages of the plurality of memory pages;
    removing, from the page table, the write-protected status from each memory page in the set of memory pages;
    recording in the second logfile corresponding pointers to each memory page in the set of memory pages;
    receiving a second logfile request from the requester to obtain contents of the second logfile;
    in response to receiving the second logfile request, generating a third logfile that is empty in which subsequent accesses to memory pages having the write-protected status are to be recorded;
    marking in the page table, at a third time by the processing device, all of the plurality of memory pages as having the write-protected status; and
    sending the second logfile to the requester to identify, to the requester, memory pages that have been modified since the first logfile request from the requester.

7. A system comprising:
    a memory to store a plurality of memory pages; and
    a processing device operatively coupled to the memory, the processing device to:
        mark, in a page table that identifies a location of each memory page in the memory, all of the plurality of memory pages as having a write-protected status;
        receive a write request to write to a first memory page of the plurality of memory pages;
        remove, from the page table, the write-protected status from the first memory page;

record a pointer to the first memory page in a first logfile;
receive a logfile request from a requester to obtain contents of the first logfile;
in response to receiving the logfile request, generate a second logfile that is empty in which subsequent accesses to memory pages having the write-protected status are to be recorded;
mark in the page table, at a second time by the processing device, all of the plurality of memory pages as having the write-protected status; and
send the first logfile to the requester to identify, to the requester, memory pages that have been modified since a previous logfile request from the requester.

8. The system of claim 7, wherein the processing device is further to generate the second logfile by replacing a first pointer that points to the first logfile with a second pointer that points to the second logfile.

9. The system of claim 7, wherein the processing device is further to grant a write request to write into a specific memory page subsequent to generating the second logfile and prior to marking the specific memory page as having the write-protected status.

10. The system of claim 7, wherein the plurality of memory pages is not locked prior to marking the plurality of memory pages as having the write-protected status.

11. A non-transitory computer readable storage medium comprising executable instructions that, when executed by a processing device, cause the processing device to:

mark, in a page table that identifies a location of each memory page of a plurality of memory pages, each memory page as having a write-protected status;
receive a write request to write to a first memory page of the plurality of memory pages;
remove, from the page table, the write-protected status from the first memory page;
record a pointer to the first memory page in a first logfile;
receive, by the processing device, a logfile request from a requester to obtain contents of the first logfile;
in response to receiving the logfile request, generate a second logfile that is empty in which subsequent accesses to memory pages having the write-protected status are to be recorded;
mark in the page table, at a second time by the processing device, all of the plurality of memory pages as having the write-protected status; and
send the first logfile to the requester to identify, to the requester, memory pages that have been modified since a previous logfile request from the requester.

12. The non-transitory computer readable storage medium of claim 11, wherein executable instructions to generate the second logfile further comprise executable instructions to cause the processing device to:
replace a first pointer that points to the first logfile with a second pointer that points to the second logfile.

13. The non-transitory computer readable storage medium of claim 11, wherein the plurality of memory pages is not locked prior to marking the plurality of memory pages as having the write-protected status.

* * * * *